April 15, 1969     W. KRÜGER     3,438,684
PRESSURE GAS LUBRICATED THRUST BLOCK
Filed July 17, 1967     Sheet 1 of 2
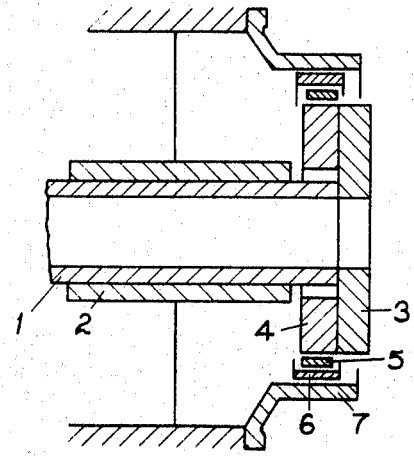
Fig. 1
Fig. 3
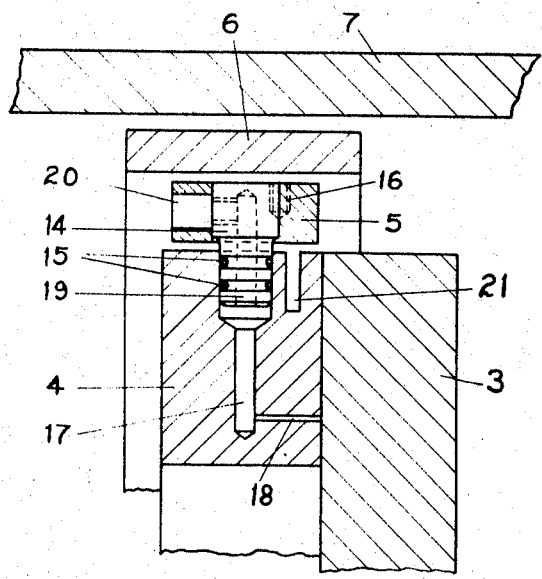
INVENTOR.
Winfried Krüger
BY
Pierce, Scheffler & Parker
Attorneys

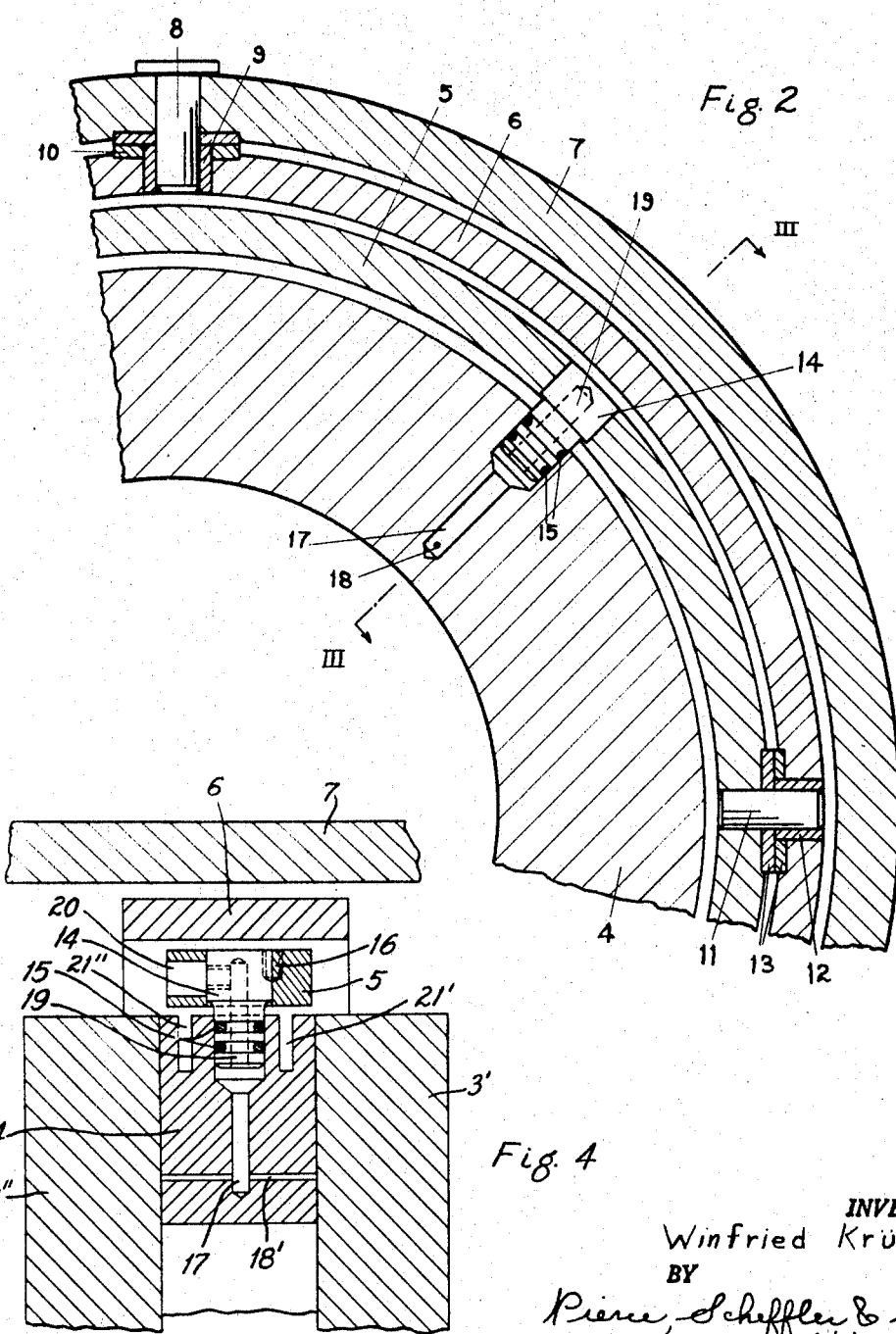

United States Patent Office 3,438,684
Patented Apr. 15, 1969

3,438,684
PRESSURE GAS LUBRICATED THRUST BLOCK
Winfried Krüger, Radolfszell, Germany, assignor to Aktiengesellschaft Brown, Boveri & Cie, Baden, Switzerland, a joint-stock company
Filed July 17, 1967, Ser. No. 653,901
Claims priority, application Switzerland, Sept. 28, 1966, 14,007/66
Int. Cl. E21b 17/046; F16c 19/04, 17/06
U.S. Cl. 308—9                                          7 Claims

ABSTRACT OF THE DISCLOSURE

A pressure gas lubricated thrust block structure for a rotatable shaft comprises one thrust block disc secured to the shaft so as to rotate with it and another, stationary thrust block disc having one plane face engaging a corresponding plane face of the rotatable thrust disc. The stationary thrust block disc is supported in a gimbal type mounting including external and internal rings, the external ring being secured by a first set of diametrally opposite gimbal pins to a stationary support and the internal ring being secured to the external ring by a second set of diametrally opposite gimbal pins displaced 90° with respect to the first set. The stationary thrust block disc is interconnected with and supported by the internal gimbal ring by means of at least three radially extending and uniformly circumferentially spaced attachment pins and a resilient element in the form of an O-ring surrounds each attachment pin. These attachment pins are provided with axially extending bores which communicate with other bores in the stationary thrust block disc leading to the interface surfaces of the thrust discs and through which the pressure gas is fed.

---

The present invention relates to a pressure gas lubricated thrust block with a stationary thrust disc suspended in gimbals from a thrust block support and with a rotating thrust block disc running on the plane bearing side of the said stationary thrust disc.

It is known to suspend stationary thrust discs in gimbals to enable the said disc to take up the appropriate alignment with the rotating thrust block disc. The thrust is transmitted from the stationary thrust disc via two bolts disposed along a diameter on to a ring and from there via two further bolts disposed along a diameter at 90° relative to the first-mentioned diameter on to the thrust block support which absorbs the said thrust.

It has been shown that protuberances occur under conditions of heavy loading of the stationary thrust disc on its plane bearing side in the zone of the apertures provided for accommodating the two bolts owing to enlargement of the said apertures. The said protuberances cause the rotating thrust block disc to touch the stationary thrust disc so that the thrust block may be rendered ineffecive.

It is the purpose of the invention to avoid this disadvantage. According to the invention the pressure gas lubricated thrust block is characterized in that the thrust disc bears via at least three radial pins upon an inner ring which in turn bears in known manner by means of gimbals suspension via an external ring upon the thrust block support.

An embodiment example of the invention is explained hereinafter by reference to the accompanying drawings, in which:

FIG. 1 is a diagrammatic longitudinal section through a thrust block according to the invention;

FIG. 2 is a cross-section through the bearing of FIG. 1;

FIG. 3 is a longitudinal section along the line III—III of FIG. 2; and

FIG. 4 is a longitudinal section view similar to FIG. 3 but illustrating a modification wherein two parallel spaced thrust block discs on the shaft engage opposite faces of a gimbal mounted thrust disc.

With reference now to FIG. 1, a partially illustrated shaft 1, for example of a gas lubricated bearing blower, is supported by a radial bearing 2 suspended in a diaphragm. The end of the hollow shaft 1 is connected to the thrust block disc 3 which also rotates. The thrust block disc is pressure gas lubricated and runs on the plane side of a stationary thrust disc 4. An internal ring 5 on which the thrust disc 4 bears via at least three radial pins, not shown in FIG. 1, is disposed around the thrust disc 4. The inner ring 5 in turn is suspended from a thrust block support 7 by means of gimbals. To this end, an external ring 6 is provided which is connected to the internal ring 5 by means of two radial pins (not shown) disposed diametrically opposite each other and to the thrust block support 7 by means of two radial pins disposed diametrically opposite each other and offset by 90° relative to the first-mentioned pins.

The arrangement of the aforementioned bolts or pins for connecting the thrust disc 4 to the inner ring 5 and for connecting the external ring 6 to the inner ring 5 and to the thrust block support 7 is shown in sectional form in FIG. 2. The external ring 6 is located relative to the thrust block support 7 by means of two pins 8 disposed in corresponding radial apertures, the second pin 8 being disposed diametrically opposite to the illustrated pin 8. The internal ring 5 is fixed to the external ring 6 by means of two pins 11 which are offset relative to the pins 8 by 90°. The pins 8 and 11 are located with slack in bushes 9 and 12 respectively. Furthermore, the external ring 6 bears via discs 10 and with slack upon the thrust block support 7, and the inner ring 5 bears via discs 13 and with slack upon the external ring 6. This arrangement represents a known gimbal suspension in which the thrust disc 4 is not directly suspended but the additional internal ring 5 is suspended in the manner described heretofore.

The stationary thrust disc 4 is connected by means of at least three radial pins 14, one of which is shown in FIG. 2, via a transition fit to the internal ring 5. Each pin 14 is disposed in corresponding radial apertures in the internal ring 5 and in the thrust disc 4. The pin is provided with one or more, in FIG. 2 with two, O-rings 15 of a resilient material to support the pin 14 in the aperture accommodating it in the thrust disc. The pin 14 is provided with appropriate annular grooves to accommodate the O-rings 15.

The arrangement of at least three connecting pins 14 with resilient elements functioning as soft intermediate layer provides a resilient multi-point support of the thrust disc 4, substantially reducing deformation of the plane side of the thrust disc which occurred hitherto in the connecting pin zone under conditions of severe axial loading of the thrust disc. Enlargement of the apertures for accommodating the connecting pins is substantially avoided by virtue of the mechanical properties of the material so that no protuberances occur at the affected positions of the plane side of the thrust disc. Provision of the O-rings as resilient elements also enables alignment inaccuracies of the apertures, as well as thermal expansions which occur in operation, to be absorbed.

A further advantage of the manner of supporting the thrust disc as described hereinbefore is due to the fact that the design of the gas duct heat system for producing the high pressure gas lubrication between the stationary thrust disc 4 and the rotating thrust block disc 3 (FIG. 1) may be substantially simplified by arranging for the pins 14 (FIG. 2) to function as gas ducts. This gas duct feed system is illustrated in FIGS. 2 and 3, FIG. 3 showing a section along the line III—III of FIG. 2. FIG. 3 also shows the thrust block support 7, the external ring 6, the internal ring 5, the stationary thrust disc 4 as well as part of the rotating thrust block disc 3.

The aperture for accommodating the pin 14 in the thrust disc 4 has an extension bore 17 of reduced section which merges into a bore 18 disposed perpendicularly thereto, i.e. axially, and extends outwardly into the gap between the thrust disc 4 and the thrust block disc 3. The pin 14 is also provided with a bore 19 into which an axial bore 20 extends for screwed connection to a fixed gas supply line (not shown) on the side facing away from the thrust block disc 3. As can be seen, the O-rings 15 provided for the resilient location of the pins 14 in the thrust disc 4 also function as sealing elements in order to prevent the escape of gas from the bores 17 and 19 of the thrust disc 4 or of the pin 14. Another resilient supporting and sealing element may also be used in place of the O-rings shown. FIG. 3 also shows that the pin 14 is secured by means of a grub screw 16 against rotation in the external ring 5.

In the embodiment example illustrated in FIG. 3, the thrust disc 4 is provided with a radial recess 21 disposed between the bearing side and the aperture for accommodating the pins 14. The aforementioned recess represents a further resilient safety device and prevents the appearance of pressure zones on the plane bearing side of the thrust disc 4.

The pressure gas lubricated thrust block described heretofore may also be employed with a doubly supported thrust disc. In this case, as illustrated in FIG. 4, a continuous bore 18' is provided which extends from bore 17 in thrust disc 4 and opens on both plane sides of this disc which engage annular surface portions of parallel spaced thrust discs 3' and 3" carried by the shaft. In addition, radial recesses 21', 21" are provided on both sides between the plane sides of thrust disc 4 and the aperture for accommodating the pins 14.

In conclusion, while one suitable embodiment of the invention has been described and illustrated, it is to be understood that various changes may be made in the construction and arrangement of component parts without, however, departing from the spirit and scope of the appended claims. As an example, while three uniformly circumferentially spaced radially extending attachment pins serve to interconnect the stationary thrust block disc with the internal ring of the gimbal suspension, more than this number of pins can be utilized, such as an arrangement of four pins spaced 90° apart around the circumference of the stationary thrust block disc.

I claim:

1. A pressure gas lubricated thrust block structure for a rotatable shaft comprising a thrust block disc secured to said shaft and rotated thereby, a stationary thrust block disc having one plane face thereof engaging a corresponding plane face of said rotatable thrust block disc, a gimbal type mounting for said stationary thrust block disc, said gimbal mounting comprising an external ring secured by a first set of diametrally opposite gimbal pins to a stationary thrust block support and an internal ring secured by a second set of diametrally opposite gimbal pins to said external ring and which are displaced 90° in relation to said first set of gimbal pins, and at least three radially extending and circumferentially spaced attachment pins interconnecting said stationary thrust block disc to said internal ring.

2. A pressure gas lubricated thrust block structure as defined in claim 1 and which further includes a resilient element interposed between each said attachment pin and said stationary thrust block disc.

3. A pressure gas lubricated thrust block structure as defined in claim 2 wherein said resilient element is constituted by an O-ring disposed concentrically about said attachment pin.

4. A pressure gas lubricated thrust block structure as defined in claim 1 wherein said attachment pins are provided with axial bores communicating with other bores in said stationary thrust block disc which lead to the interface surfaces on said stationary and rotatable thrust block discs and through which the pressure gas is fed.

5. A pressure gas lubricated thrust block structure as defined in claim 1 which further includes a resilient element in the form of a ring interposed between each said attachment pin and said stationary thrust block disc, and wherein said attachment pins are provided with axial bores communicating with other bores in said stationary thrust block disc which lead to the interface surfaces on said stationary and rotatable thrust block discs and through which the pressure gas is fed.

6. A pressure gas lubricated thrust block structure as defined in claim 1 wherein said stationary thrust block disc is provided with radial recesses disposed respectively between each radial recess in which each said attachment pin is received and that face of said stationary thrust block disc which engages the face of said rotatable thrust block disc.

7. A pressure gas lubricated thrust block structure as defined in claim 1 wherein said stationary thrust block disc is provided with two plane bearing sides into which open bores extend for supplying the pressure gas.

References Cited

UNITED STATES PATENTS 985,358   2/1911   Mackintosh _____ 308—142

MARTIN P. SCHWADRON, *Primary Examiner.*

FRANK SUSKO, *Assistant Examiner.*

U.S. Cl. X.R.

308—135, 160